June 19, 1951  E. M. WAGNER  2,557,807
VALVED COUPLING
Filed Aug. 15, 1947  2 Sheets-Sheet 1
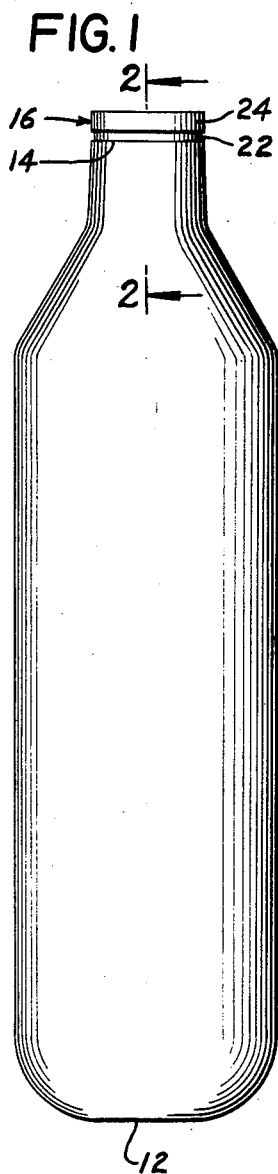
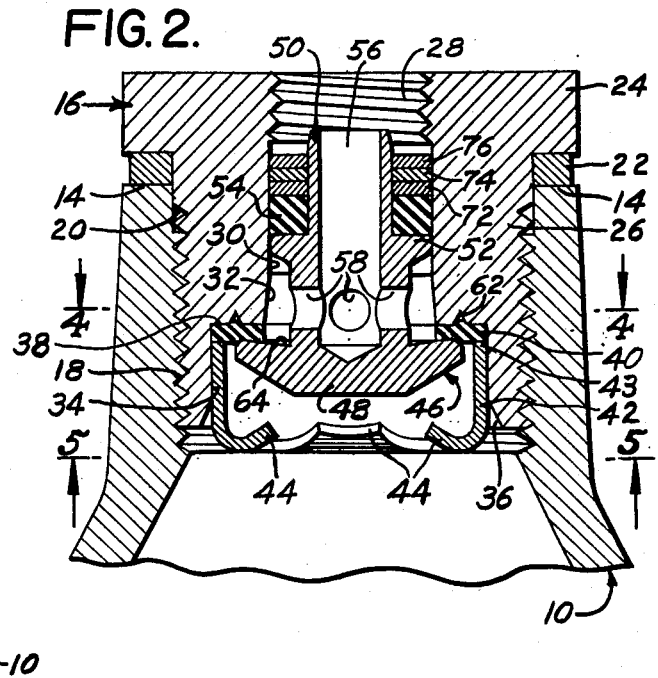
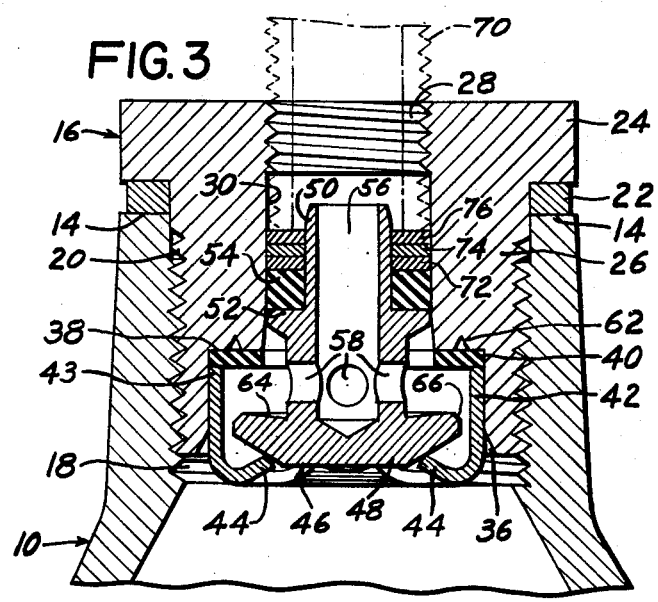
INVENTOR.
EDMOND M. WAGNER
BY
James D. Rock
ATTORNEY June 19, 1951     E. M. WAGNER     2,557,807
VALVED COUPLING
Filed Aug. 15, 1947     2 Sheets-Sheet 2
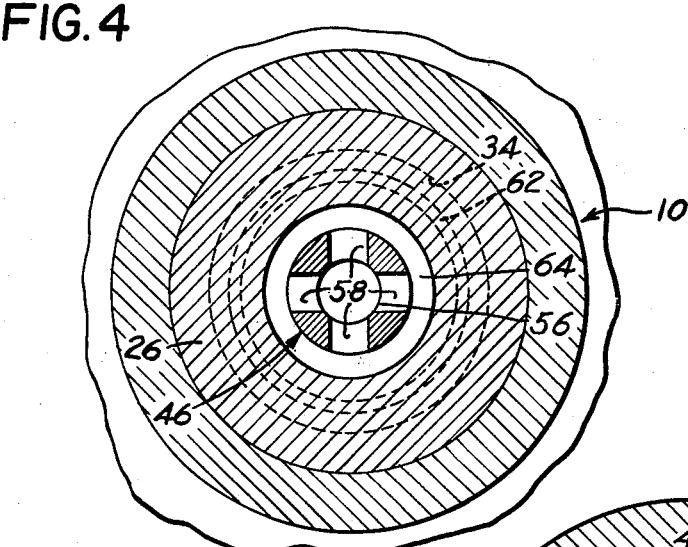
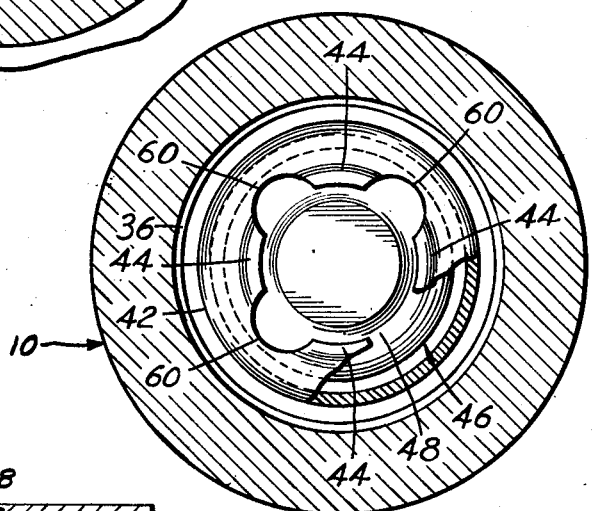
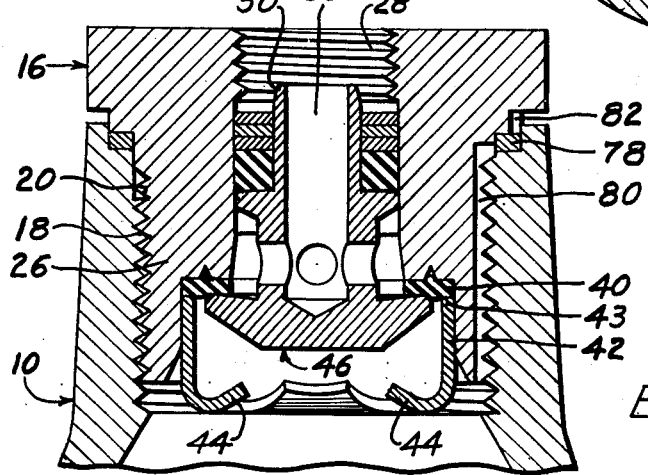
INVENTOR.
EDMOND M. WAGNER
BY James D. Bock
ATTORNEY Patented June 19, 1951

2,557,807

UNITED STATES PATENT OFFICE 2,557,807

VALVED COUPLING

Edmond M. Wagner, San Marino, Calif., assignor, by mesne assignments, to Associated Development and Research Corporation, New York, N. Y., a corporation of New York Application August 15, 1947, Serial No. 768,797

3 Claims. (Cl. 284—18)

This invention relates to an improved valve for use particularly in connection with portable containers adapted to hold a supply of gas under high pressure.

The valve of the present invention is particularly adapted for use in connection with bottles or capsules containing carbon dioxide, the valve being so designed as to be threaded upon the usual vehicle tire valve stem which operation serves to open the valve and permit the flow of carbon dioxide from the bottle into the tire for the inflation of the latter. While numerous devices of this general type are currently available in the market, the valve of the present invention embodies specific improvements whereby its throttling effect may be availed of for accurate control of the flow of gas to the vehicle valve stem and whereby the valve seat material is protected from dislodgment or damage incident to use.

It is a general object of the present invention to provide a valve which is well adapted for repeated use, as for the inflation of several tires at different times or for alternate inflation and bottle refilling operations, without danger of developing leaks. The valve frequently comprises one of the major items of expense in the manufacture of a portable tire inflator and the ability to re-use the valve several times or to refill the bottle a number of times for successive uses is an important feature from the standpoint of economy and the resultant sales appeal of the device.

More specifically the valve seat material of the valve of the present invention is so arranged that the passage of gas from the bottle to a tire will not tend to destroy or dislodge the same. Furthermore, the valve plunger and the valve body are so particularly designed that the pressure of the gas within the bottle or container will hold the valve closed without the aid of springs and the valve seat material will be so confined between these elements of the valve as to be unlikely to be cut or otherwise damaged in use or to creep or develop leaks during long periods of storage without use. In addition, since the valve is so designed as to be moved to open position by the mere act of screwing the valve body on to a vehicle valve stem, specific provision is made for avoiding turning of the valve plunger on the seat material during such operation.

The valve of the present invention is so designed as to be almost entirely proof against opening by tampering and against removal from the bottle by other than competent service personnel equipped with special tools. These and other safety factors are of importance to the present invention and will be described in detail hereinbelow.

The general objects of the invention will be apparent from the foregoing general description and other and further objects will become apparent upon a consideration of the following detailed description of preferred forms of the invention taken in connection with the drawings accompanying and forming a part of the present specification. In the drawings:

Fig. 1 is an elevational view of a portable tire inflating device having the valve of the present invention embodied therein;

Figs. 2 and 3 are sections along the line 2—2 in Fig. 1, the parts being shown in different operative positions in the respective figures;

Fig. 4 is a section along the line 4—4 of Fig. 2;

Fig. 5 is a section along the line 5—5 of Fig. 2, and

Fig. 6 is a view similar to Fig. 2 and showing a modified form of the invention.

Referring now to the drawings, in Fig. 1 there is shown a container 10 which may comprise a metal bottle or capsule of proper size and design to contain safely a quantity of gas such as carbon dioxide under high pressure. Desirably the quantity of gas contained within the container 10 is at least sufficient to inflate one automobile tire to a pressure such that the vehicle may be moved without damage to the tire. At one end 12 the container 10 is permanently closed while at the opposite end 14 there is provided an internally threaded opening adapted to receive a valve assembly generally indicated at 16. As shown in Fig. 2, for example, the internally threaded opening in the container 10 is indicated at 18. The valve 16 may have formed on a suitable cylindrical surface thereof a set of external threads 20 adapted to be received within the internal threads 18. In the form of the invention shown in Fig. 2 a suitable sealing washer 22 is interposed between a flange 24 on the valve 16 and the end 14 of the bottle 10. The washer 22 may be made of any suitable compressible material such, for example, as a soft metal like aluminum.

The body 26 of the valve 16 is provided with a centrally disposed bore, the outer end portion of which is threaded at 28 to receive the external threads formed upon a conventional vehicular tire valve stem and a portion of which is formed with a smooth cylindrical wall 30 flaring outwardly at 32 and opening into a chamber 34 formed in the inner end of the valve body 26.

The chamber 34 may be provided with an outwardly flared portion 36 which opens into the interior of the container 10 when the valve 16 is positioned in such a container.

The shoulder 38 extending from the flared portion 32 of the bore and forming what may be considered to be the bottom of the recess 34, serves as a valve seat supporting area adapted to receive an annular body 40 of suitable valve seat material such, for example, as "Corprene," a commercially available product comprising a combination of neoprene and ground cork. The external diameter of the valve seat 40 is preferably substantially equal to that of the cylindrical wall of the chamber 34. A retainer 42 is adapted to be press-fitted into the chamber 34 bringing the inner end 43 thereof into contact with the outer peripheral portion of the valve seat 40. The retainer 42 thus serves to hold the valve seat 40 securely against the shoulder 38 of the valve body. Preferably the retainer 42 is provided with a plurality of lips 44 which are turned inwardly to retain and limit movement of the valve plunger (not yet described) within the valve and provide for passage of gas around the valve plunger when it is lifted.

A valve plunger is indicated generally at 46, having a head 48 provided with a flange adapted to overhang the valve seat 40, and a hollow stem 50 which in turn is provided with an annular sealing flange 52 for cooperation with a sealing washer 54 made of suitable compressible material such as "Corprene." The hollow stem 50 is provided with an internal bore 56 communicating with horizontally disposed crossed openings 58 which serve to place the hollow stem into communication with the annular space within the valve body 26. Thus when the valve plunger 46 is moved from the position shown in Fig. 2 wherein the valve is closed to the position shown in Fig. 3 wherein the valve is opened, the internal bore 56 of the hollow stem is placed in communication with the interior of the container 10.

It will be understood that the inwardly turned retaining lips 44 are so designed that when turned inwardly as shown in the drawings, they will define an opening (see Fig. 5) having an effective diameter less than that of the head 48 of the valve. When the valve plunger 46 is moved to fully opened position as in Fig. 3, the head 48 is moved into contact with the inner ends of the lips 44. In this position the gas is free to pass through semicircular notches 60 formed between the lips 44 as clearly shown in Figs. 3 and 5.

The shoulder 38 against which the valve seat 40 is retained is provided with a circular groove 62 which is preferably V-shaped in cross-section and the diameter of which is just slightly greater than the greatest diameter of the head 48 of the valve plunger 46. The seat engaging surface of the head 48 is undercut during manufacture so as to slope slightly inwardly of the head thereby to bring the outer periphery thereof into engagement with the valve seat 40 before the remaining portions thereof are brought into such engagement. Pressure is thus more concentrated on the valve seat material in the region adjacent the outer extremity of the valve head 48. This undercut is indicated at 64 and in practice it has been found that the angle of the undercut should be from about 3 to about 5 degrees from the horizontal as viewed in Fig. 2, for example. Preferably also the outer extremity of the valve seat engaging surface of the valve head 48 is chamfered as at 66 merely to remove the sharp edge that otherwise would be formed at this point and which might tend to cut the valve seat material.

From a consideration of Fig. 2 it will be appreciated that when the valve is held in closed position as by the pressure of gas upon the head 48, the pressure concentrated near the outer periphery of the valve head upon the valve seat material will tend to cause the material beyond the head 48 to flow radially outwardly to force part of this material to flow into the V-shaped annular groove 62. Simultaneously the seat material under the head 48 will tend to flow radially inwardly. Thus the central portion of the material, that is that portion at the periphery of the head 48 will not tend to flow in either radial direction but to be securely locked between the periphery of the head 48 and the groove 62. This has been found to be particularly effective in the formation of a leak-proof seal and the maintaining thereof during long storage periods without damage to the seat material.

It will be appreciated that the pressure which serves to hold the valve plunger in closed position is that of the gas against the head 48 of the valve plunger and therefore that the total force for compressing the valve seat material is dependent upon the area of the head 48 exposed to the gas within the container 10. Obviously the total force might be increased by forming a large head upon the valve plunger, thus increasing the overall size and cost of the valve, but in such event this relatively larger force must be overcome when it is desired to open the valve. Heretofore it has been necessary to compromise between these extremes. In the valve of the present invention the effectiveness of the seal is very greatly enhanced by concentrating the available pressure upon the valve seat material 40 at the periphery of the head 48. It will be noted that the line of greatest pressure upon the valve seat 40 comprises a circle the diameter of which is just slightly less than the smaller diameter of the groove 62 whereby the greatest pressure is exerted directly through the valve seat material 40 and upon the flat portion of the shoulder 38 lying just inside the groove 62. A portion of the valve seat material lying just outside the line of greatest pressure is thus forced to flow into the groove 62. In this manner an effective barrier against gas leakage is established at both faces of the valve seat 40. In view of the concentration of pressure and the formation of the barriers just described, it is not necessary for the head 48 to have an area so great as to render lifting of the valve plunger 46 unduly difficult.

As shown in Fig. 3 the valve is opened by screwing the valve body on to an externally threaded tube or conduit 70. The tube 70 may comprise the conventional externally threaded vehicle tire valve stem or the discharge tube of a refilling device, or any other tube or conduit with which it is desired to connect the container 10. It will be apparent that for the tube 70 to open the valve, it must, in effect, be brought into contact with the valve plunger which will be rotating relative to the tube 70 during the operation of screwing the valve on to the tube 70. If such contact were direct or merely through a compressible sealing washer, the friction therebetween would tend to cause relative rotation between the valve seat material and the valve plunger. Under such circumstances there would be severe danger of damaging or dislodging the valve seat. In the present invention a simple and effective provision has been made to avoid such danger. Thus, referring to Figs. 2 and 3, it will be observed that the diameter of the hollow stem 50 of the valve plunger 46 is such as to be received within the opening provided in the tube 70. On its outer surface the hollow stem 50 is provided with the sealing washer 54 described above and in addition, is provided with a plurality of superimposed bearing washers 72, 74 and 76 which preferably are made of smooth-surfaced metal such, for example, as hard-rolled brass. One surface of the washer 72 bears against a surface of the sealing washer 54 while its opposite surface bears against a corresponding surface of the washer 74. One surface of the washer 76 bears against the opposite surface of the washer 74 while the other or outer surface of the washer 76 is positioned for engagement with the end of the tube 70 when the latter is inserted into the valve body. Thus there are several smooth interengaging metal surfaces interposed as anti-friction devices between the end of the tube 70 and the valve plunger 46. The friction between the interengaging surfaces of the washers 72, 74 and 76 is a great deal less than that between the periphery of the valve head 48 and the seat material 40 and the relative rotation of parts occurs between the washers 72, 74 and 76. Therefore, in accordance with the present invention, there is no likelihood of damage to the valve seat 40. Obviously a greater or fewer number of bearing washers may be employed if so desired, the three washers 72, 74 and 76 disclosed herein having been found to be completely effective in a device particularly designed for the inflation of automobile tires.

From an inspection of Figs. 2 and 3, it will be apparent that the washers 72, 74 and 76 are quite closely fitted to the external surface of the hollow tube 50 and to the inner surface of the bore 30. Similarly the shoulder 52 on which the sealing washer 54 rests is quite closely fitted within the bore 30. This is to prevent extrusion of the material of which the sealing washer 54 is made. It also will be apparent that the relatively close fits just described will serve to guide the valve plunger 46 in its movement within the bore of the valve body 26 and thus assure accurate seating of the head 48 upon the valve seat 40. If so desired, the washers 72, 74 and 76 may be lubricated with wax or powdered graphite or the like although this has not been found to be essential under ordinary conditions.

In the modification shown in Fig. 6 the sealing washer 78 is shown completely recessed whereas in the remaining figures one surface of the sealing washer 22 is exposed. It may be considered preferable to use the completely enclosed sealing washer 78 as shown in Fig. 6 in order to make tampering more difficult. It will be understood that either the washer 22 in Figs. 1 through 5 or the washer 78 in Fig. 6 may be made of a fusible metal, if so desired, for purposes of safety in the event the assembled device is exposed to fire. The melting point of such fusible washers is so chosen with regard to the bursting strength of the device as a whole as to melt at a temperature below that which might develop an unsafe internal pressure. In the form of the invention shown in Figs. 1 through 5 sufficient clearance must be left between the threads 18 and 20 to permit the escape of gas therethrough in the event the fusible washer 22 is melted. A similar provision may be made in connection with Fig. 6. Alternatively, as shown in Fig. 6, a groove 80 may be formed in the threads 20 communicating with the opening in which the washer 78 is positioned and an additional groove 82 may be formed in the flange 24 whereby upon melting of the washer 78, gas may escape through the grooves 80 and 82.

A further safety feature lies in the smoothly machined external surface presented by the flange 24 of the valve body. Preferably the diameter of this portion of the valve body is approximately equal to or smaller than that of the end 14 of the container 10 whereby to offer little temptation or opportunity for the removal of the valve from the container by other than authorized persons equipped with a tool especially designed to grip the narrow smooth edge of the flange.

In operation the valve of the present invention has been found to be particularly reliable and to offer very definite advantages over earlier forms of valves. The securing of the valve seat material 40 to a shoulder formed on the valve body as distinguished from the securing of the seat material to the valve plunger permits gradual throttled opening of the valve to occur automatically without displacement of the valve seat material. When the valve is first opened the gas within the container 10 will flow around the periphery of the head 48 at a high velocity. From an inspection of Fig. 3, it will be apparent that the path of the gas is such as to tend to hold the seat 40 in place rather than to lift or otherwise dislodge it from the shoulder 38. In contrast to this, if the seat material were secured to the under surface of the head 48, the initial flow of gas would be against an exposed edge of the seat material tending to swing the material downwardly and block the passage temporarily during the opening operation. Under the latter conditions the valve would remain closed until the plunger had moved a relatively great distance at which time there would be a sudden release of a large flow of gas. The latter effect is particularly harmful to the conventional valve insides of tire valve stems. The valve of the present invention overcomes this difficulty entirely and provides for accurate control of the rate of flow of gas from the container 10 to the tube 70.

The maximum flow of gas through the valve of the present invention may be established by proper selection of size of the crossed openings 58. Preferably the maximum flow is so limited when the valve is designed for use with a vehicle tire, as not to reach a velocity within the tire valve stem which is likely to damage the tire valve insides.

In the event a desired quantity of gas has been withdrawn from the container without exhausting the same, the container is merely removed from the tube 70 by unscrewing. The pressure of the gas upon the upper surface of the head 48 is exerted upon a much larger area than the pressure exerted on the under surface of the head 48. This unbalanced condition is effective to close the valve securely immediately that it is unscrewed from the tube 70.

It will be apparent that when the container 10 is filled or refilled through the valve 16, the flow of gas will be in a direction opposite to that discussed above. It is therefore recommended that the filling device be equipped with a separate valve and that such valve be kept closed until the valve plunger 46 has been moved by the filling tube to fully opened position. If the separate valve then be opened, the holes 58 will be effective to throttle the incoming gas and to hold the velocity thereof sufficiently low to avoid the danger of lifting the valve seat 40 from the shoulder 38.

In the above detailed disclosure of preferred forms of the invention the language chosen has been used in a descriptive rather than in a limiting sense and it will be apparent that modifications and variations in details of such disclosure may be made within the scope of the appended claims.

I claim:

1. In a valve for use on cylinders containing gases under pressure of the magnitude of two or more atmospheres the combination of a valve having a passageway extending therethrough, said passageway having a lesser diameter at one end and a greater diameter at the other; a shoulder in said passageway and in a plane substantially transverse to the axis of the passageway, said shoulder connecting the section of the passageway having lesser diameter with the section having a greater diameter; a valve plunger within said passageway having a valve head, a stem and an enlargement upon said stem, the portion of said enlargement most remote from said head having a surface presenting a plane substantially perpendicular to the axis of said passageway; a plurality of washers mounted upon said stem and adjacent to said surface and freely and independently rotatable thereon whereby pressure from an external valve stem can be transmitted axially of said valve plunger to open said valve but rotational forces from said external valve stem cannot be transmitted to said enlargement.

2. In a portable tire inflater device having a container adapted to hold a supply of gas under high pressure with a valve body having a passageway extending therethrough, said passageway having a portion of relatively small diameter and a portion of relatively large diameter the combination of a valve seat shoulder formed in said passageway and presenting an annular surface lying substantially in a plane transverse of the axis of said passageway and connecting the portion of relatively small diameter with the portion of relatively large diameter; a valve seat made of compressible material and secured to said shoulder; a valve plunger having a head, a stem and an enlargement upon said stem, said valve plunger being slideably disposed within said passageway for movement of said head toward and from said valve seat shoulder to close and open said passageway, said head being angularly undercut so that the peripheral portion thereof will engage said valve seat before the remaining portion thereof when said head is moved into engagement with said valve seat; a circular groove formed in the surface of said shoulder, said groove having its smallest diameter greater than the mean diameter of the angularly undercut portion of said head; and a plurality of washers having a smooth annular surface and stacked upon said stem for cooperation with said enlargement so as to be capable of transmitting pressure lengthwise of the stem while being substantially incapable of transmitting rotation whereby upon closure of said valve radial pressure will be exerted by said head upon said valve seat, thus forcing the valve seat material to flow into said circular groove upon closure of said valve.

3. In a portable tire inflater device having a container adapted to hold a supply of gas under pressure several times as high as that applied to vehicular tires with a valve body having a passageway extending therethrough, said passageway having a portion of relatively small diameter and a portion of relatively large diameter, the combination of a shoulder joining said portions, said shoulder presenting an annular surface lying substantially in a plane transverse of the axis of said passageway; a valve seat comprising an annular body of compressible material lying on said shoulder, a retainer frictionally fitted into said large diameter portion of said passageway and holding said valve seat material in position upon said shoulder; a valve plunger having an enlarged head, a stem, and an enlargement upon said stem, said valve plunger being slidably disposed within said passageway for movement of said head toward and from said valve seat shoulder, and said enlarged head being positioned within said large diameter portion of said passageway and overhanging said valve seat; and a plurality of washers having smooth annular surfaces and stacked upon said stem for cooperation with said enlargement so as to transmit pressure lengthwise of the stem while being substantially ineffective to transmit rotation thereby permitting said compressible material to be compressed between said shoulder and said enlarged head during closure of said valve without being subjected to rotational forces.

EDMOND M. WAGNER.

REFERENCES CITED

The following references are of record in the file of this patent:

UNITED STATES PATENTS

| Number | Name | Date |
|---|---|---|
| 134,095 | Pearce | Dec. 17, 1872 |
| 1,702,580 | Thalte | Feb. 19, 1929 |
| 1,905,777 | Williams | Apr. 25, 1933 |
| 1,937,246 | Reedy | Nov. 28, 1933 |
| 1,968,075 | Ewald | July 31, 1934 |
| 2,044,629 | Parker | June 16, 1936 |
| 2,136,690 | Jardine | Nov. 15, 1938 |
| 2,201,065 | Toolan | May 14, 1940 |
| 2,318,965 | Parket et al. | May 11, 1943 |
| 2,320,456 | Frazer-Nash | June 1, 1943 |
| 2,323,531 | Franck | July 6, 1943 |
| 2,357,002 | Houser | Aug. 29, 1944 |